US011009963B2

(12) United States Patent
Groh et al.

(10) Patent No.: US 11,009,963 B2
(45) Date of Patent: May 18, 2021

(54) SIGN LANGUAGE INPUTS TO A VEHICLE USER INTERFACE (71) Applicant: Ford Global Technologies, LLC, Dearborn, MI (US)

(72) Inventors: Alexander Groh, Dearborn, MI (US); Mohannad Hakeem, Dearborn, MI (US); Umer Khalid, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 16/302,242

(22) PCT Filed: May 20, 2016

(86) PCT No.: PCT/US2016/033606
§ 371 (c)(1),
(2) Date: Nov. 16, 2018

(87) PCT Pub. No.: WO2017/200553
PCT Pub. Date: Nov. 23, 2017

(65) Prior Publication Data
US 2019/0204931 A1 Jul. 4, 2019

(51) Int. Cl.
*G06F 3/01* (2006.01)
*G01C 21/36* (2006.01)
(Continued)

(52) U.S. Cl.
CPC .............. *G06F 3/017* (2013.01); *B60K 37/06* (2013.01); *G01C 21/34* (2013.01);
(Continued)

(58) Field of Classification Search
CPC .......... G06F 3/017; G06F 3/165; G06F 3/167; G10H 1/46; G10H 1/00; B60K 37/06;
(Continued)

(56) References Cited

U.S. PATENT DOCUMENTS 7,308,112 B2   12/2007   Fujimura et al.
8,577,593 B2   11/2013   Oesterling et al.
(Continued)

FOREIGN PATENT DOCUMENTS

DE   102012020607 A1   4/2014
DE   102013224810 A1   6/2015
(Continued)

OTHER PUBLICATIONS

International Search Report and Written Opinion issued in International Application No. PCT /US2016/033606, dated Aug. 19, 2016 (23 pages).
(Continued)

*Primary Examiner* — Rodney A Butler
(74) *Attorney, Agent, or Firm* — Brandon Hicks; Eversheds Sutherland (US) LLP (57) ABSTRACT

Sensors in a vehicle detect execution of a sign language symbol. The sign language symbol invokes a vehicle interface function. In some embodiments, the sign language symbol is an ASL sign. Sensors include three-dimensional optical, ultrasonic, or other sensors. The locations of targets (fingertips, knuckles, palm, etc.) are detected in the individual outputs of the sensors. The locations of targets determined from the outputs of multiple sensors may be associated with one another and filtered, such as using an RBMCDA algorithm and Kalman filtering. The system may be calibrated to detect each symbol by measuring the target locations with the user executing the each symbol.

16 Claims, 5 Drawing Sheets

(51) Int. Cl.

| | | |
|---|---|---|
| *G10H 1/46* | (2006.01) | |
| *G10H 1/00* | (2006.01) | |
| *B60K 37/06* | (2006.01) | |
| *G01C 21/34* | (2006.01) | |
| *G06T 7/70* | (2017.01) | |
| *G06K 9/00* | (2006.01) | |
| *G06F 3/16* | (2006.01) | |

(52) U.S. Cl.
CPC ..... *G01C 21/3664* (2013.01); *G06K 9/00355* (2013.01); *G06K 9/00832* (2013.01); *G06T 7/70* (2017.01); *G10H 1/00* (2013.01); *G10H 1/46* (2013.01); *B60K 2370/146* (2019.05); *B60K 2370/1464* (2019.05); *B60K 2370/48* (2019.05); *G06F 3/165* (2013.01); *G06F 3/167* (2013.01); *G06T 2207/10012* (2013.01); *G06T 2207/20024* (2013.01); *G06T 2207/30196* (2013.01); *G06T 2207/30268* (2013.01)

(58) Field of Classification Search
CPC ........ B60K 2370/48; B60K 2370/1464; B60K 2370/146; G01C 21/34; G01C 21/3664; G06K 9/00355; G06K 9/00832; G06T 2207/10012; G06T 2207/20024; G06T 2207/30196; G06T 2207/30268; G06T 7/70

See application file for complete search history.

(56) References Cited

U.S. PATENT DOCUMENTS

| | | | |
|---|---|---|---|
| 8,942,881 B2 | 1/2015 | Hobbs et al. | |
| 2003/0202683 A1* | 10/2003 | Ma ................... | G08G 1/096725 |
| | | | 382/104 |
| 2005/0031166 A1 | 2/2005 | Fujimura et al. | |
| 2008/0170749 A1 | 7/2008 | Albertson et al. | |
| 2011/0301934 A1 | 12/2011 | Tardif | |
| 2013/0050131 A1* | 2/2013 | Lee ..................... | G06F 3/04883 |
| | | | 345/174 |
| 2013/0156296 A1 | 6/2013 | El Dokor | |
| 2013/0261871 A1* | 10/2013 | Hobbs .................. | B60K 37/06 |
| | | | 701/28 |
| 2014/0309864 A1* | 10/2014 | Ricci .................... | A61B 5/4809 |
| | | | 701/36 |
| 2014/0309927 A1* | 10/2014 | Ricci .................. | G06Q 30/0645 |
| | | | 701/424 |
| 2015/0053066 A1 | 2/2015 | Hampiholi et al. | |
| 2015/0081133 A1* | 3/2015 | Schulz .................. | B60K 35/00 |
| | | | 701/1 |
| 2015/0193197 A1* | 7/2015 | Nahman ................ | G06F 3/017 |
| | | | 715/716 |
| 2016/0364004 A1* | 12/2016 | Ekandem ............. | G05D 1/0033 |
| 2017/0060254 A1* | 3/2017 | Molchanov .......... | G06N 3/0454 |
| 2017/0242491 A1* | 8/2017 | Wild ...................... | G06F 3/017 |
| 2018/0009442 A1* | 1/2018 | Spasojevic ............ | A61B 3/112 |

FOREIGN PATENT DOCUMENTS

| | | | | |
|---|---|---|---|---|
| EP | 2891950 A1 | 7/2015 | | |
| GB | 2523353 A | * | 8/2015 | ......... G06K 9/00818 |

OTHER PUBLICATIONS

Notice of Preliminary Report on Patentability issued in International Application No. PCT /US2016/033606, dated Nov. 20, 2018 (7 pages).

Sarkka, et al. Rao-Blackwellized Monte Carlo Data Association for Multiple Target Tracking, The 9, 10, 19, 20 7th International conference on Information Fusion, Jul. 1, 2004 [Retrieved on Jul. 22, 2016] Retrieved from the internet: URL:https:1/users.aalto.fi/-ssarkka/pub/rbmcda.pdf.

* cited by examiner

SIGN LANGUAGE INPUTS TO A VEHICLE USER INTERFACE

BACKGROUND

Field of the Invention

This invention relates to user interfaces for systems of a vehicle.

Background of the Invention

A modern vehicle performs many functions beyond transportation. For example, sound systems, climate controls, interfaces to a mobile phone or other communication system, and other functions may be provided to an occupant of a vehicle. Accordingly, controls for these functions must be provided. In order to reduce the number of buttons, interface functions may be implemented using a touch screen interface. Controls may be further simplified by providing a voice control system, such as the FORD SYNC system.

The systems and methods disclosed herein provide an improved approach for receiving user inputs from the hearing impaired without requiring interaction with a touch screen or other physical interface element.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
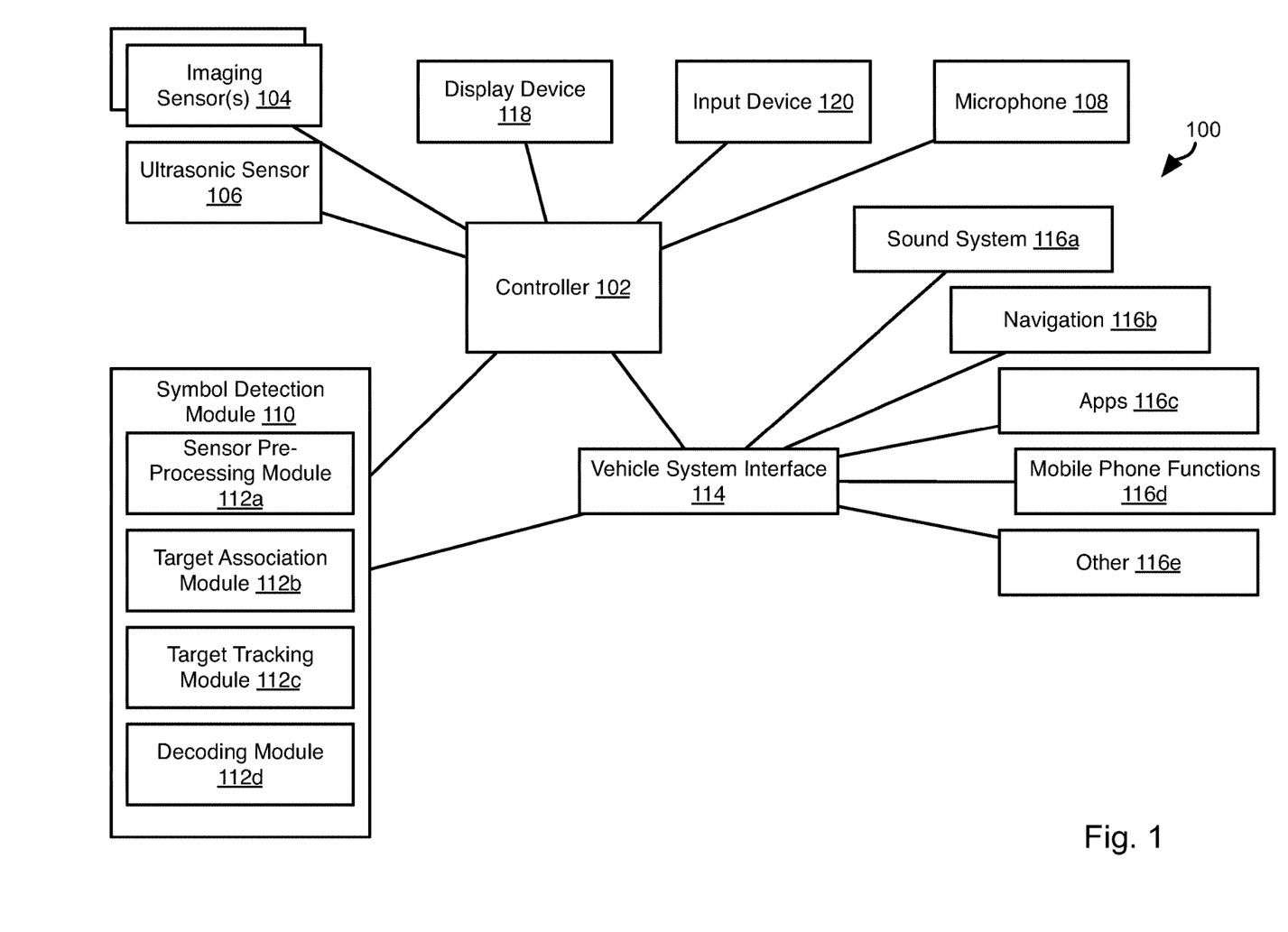
FIG. 1 is a schematic block diagram of a system for implementing embodiments of the invention.

FIG. 1 illustrates electronic components 100 that may be incorporated into a vehicle. The electronic components 100 may include a controller 102 housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle. As discussed in greater detail herein, the controller 102 may control one or more vehicle systems according to visual symbols as described below with respect to the methods of FIGS. 4 and 5.

The controller 102 may receive one or more data streams from one or more imaging sensors 104. The imaging sensors 104 may be three-dimensional imaging sensors that provide both an image of objects in the field of view thereof and a depth of the objects. For example, the imaging sensor 104 may be a depth sensor such as provided by MICROSOFT KINECT or the like.

Other sensors may also be coupled to the controller 102 and provide an estimate of a depth to an object within its field of view. For example, an ultrasonic sensor 106 may be coupled to the controller 102. The controller 102 may also be coupled to a microphone 108 positioned within the cabin of the vehicle for receiving spoken or other audible commands.

The controller 102 may execute a symbol detection module 110 that receives the data streams from the sensors 104, 106 and identifies visual symbols executed by an occupant of the vehicle. For example, symbols executed may be American Sign Language (ASL) symbols. Although the systems and methods disclosed herein are described with respect to ASL, any other sign language may be implemented in an identical manner.

The symbol detection module 110 may include a sensor pre-processing module 112a. The sensor pre-processing module 112a processes raw outputs of each sensor individually and identifies targets in the sensor outputs. Targets as used herein refer to parts of a hand, arm, or face of an occupant. In particular, for a hand, fingertips, joints, spans between joints, a palm, a back of the hand, and a wrist, may be identified. For an arm, an elbow, shoulder, forearm, and upper arm may be identified. For a face, eyes, nose, mouth may be identified. The manner in which targets are identified may include any method known in the art of image processing, such as those implemented by the MICROSOFT KINECT or like systems. The output of the sensor pre-processing module 112a may be a list of target locations, such entries including values <a, x, y, z>, where 'a' is an identifier of the target (fingertip, eye, palm, first knuckle of the index finger, etc.), and 'x, y, z' are three dimensional coordinates of the target in the field of view of the sensor. In some embodiments, the list of target locations may represent, or be transformed into skeletal mapping vectors that represents the position of orientation of bones of the hand in order to facilitate identification of a symbol being executed by the user. Skeletal mapping vectors may be embodied as line segments that define the different bones in the hands, wrist, forearm, etc. and have a translation and rotation in relation to the body center. These line segments vary over time. These line segments may be tracked over time and associated to the correct body part. The motion of the body pairs may then be captured and interpreted.

The symbol detection module 110 may include a target association module 112b. Where there are multiple sensors 104, 106 having an occupant in their field of view, all may detect the same target. Accordingly, the target association module may attempt to match target locations corresponding to the same target to one another. As described in greater detail below, this may include executing a Rao-Blackwellized Monte Carlo Data Association (RBMCDA) algorithm. The output of the target association module 112b may be lists of locations for the tracked targets, where the entries for each list correspond to a single target derived from the multiple measurements of the single target by the multiple sensors 104, 106 according to the RBMCDA algorithm.

The output of the target association module 112b is input to a target tracking module 112c that processes the list of target locations in the context of movement of the target over time. For example, the target tracking module 112c may process the locations of each target over time according to a Kalman filter using contextual information. The Kalman filter removes noise in the detected location of each target, i.e. random variation, outliers that are clearly erroneous, etc.

The Kalman filter, also known as a linear quadratic estimation, is a filter that takes in a series of measurements over time and produces estimates that are more precise than those based on only a single measurement. The contextual information is the measurements taken in the past and future of a particular estimate. For example, the estimate for timestep=k uses information from timesteps=k−1, k, and k+1.

The locations of the targets as processed by the target tracking module 112c may be input to the decoding module 112d. The decoding module 112d maps a state of the targets at a given moment and/or a progression of the targets over time to an ASL word or character outputs data (e.g. text) corresponding to the ASL word or character.

The output of the decoding module 112d may be input to a vehicle system interface 114. The vehicle system interface 114 may be a computing device, or a functionality implemented by the controller 102 itself, that couples commands to one or more vehicle systems 116a-116e and/or receives status information therefrom. For example, the vehicle systems may include a sound system 116a, navigation system 116b, mobile applications 116c, mobile phone functions 116d, or other functions 116e. In some embodiments, sound system 116a may be part of a vehicle infotainment system.

The controller 102 may be coupled to a display device 118 and an input device 120. The display device 118 and input device 120 may be embodied as a touch screen. In some embodiments, the display device 118 is a heads-up display (HUD) that displays information on the windshield of the vehicle or other transparent screen. Status information for the vehicle systems 116a-116e may be displayed through the display device 118. Inputs for controlling the vehicle systems may also be received through the input device 120. The inputs received by the vehicle system interface 114 through the input device 120 may invoke the same functions that may be invoked using ASL symbols decoded by the symbol detection module 110.

Figure 2:
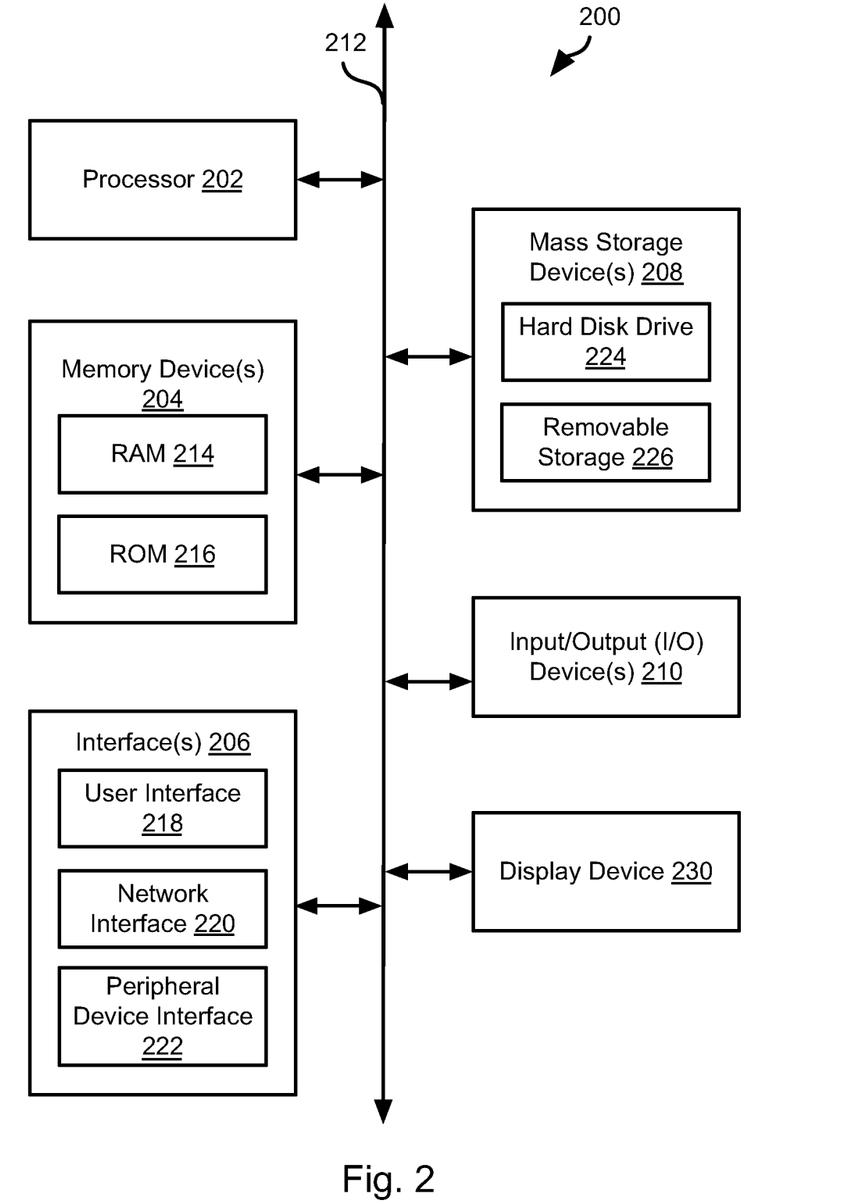
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and vehicle system interface 114 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
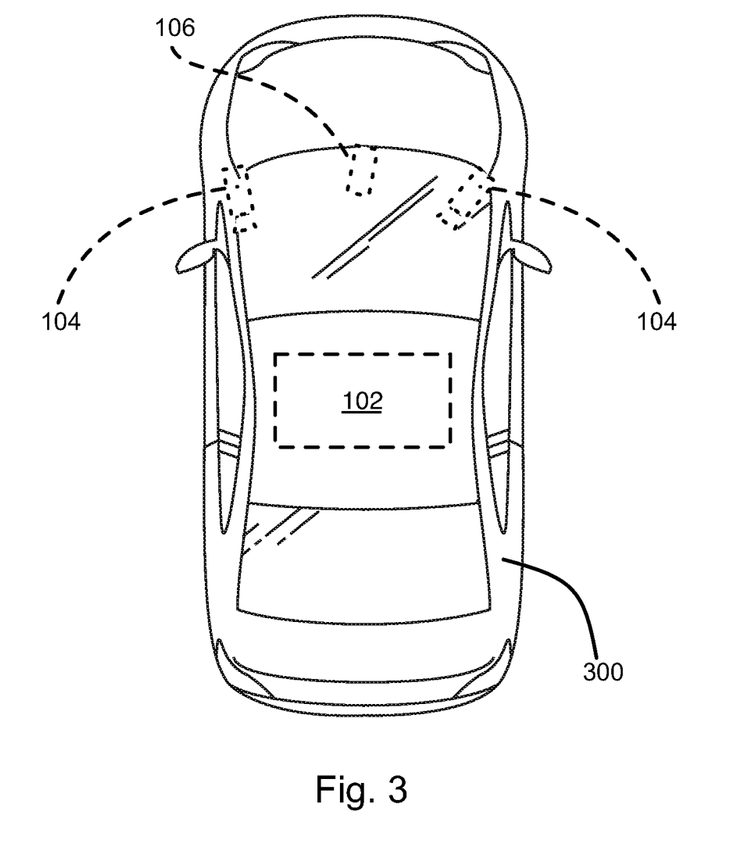
FIG. 3 is a schematic diagram of a vehicle with sensors for detecting visual inputs in accordance with an embodiment of the present invention.

Referring to FIG. 3, a vehicle 300 may include the controller 102 housed therein as well as some or all of the other electronic components shown in FIG. 1. As shown, the imaging sensors 104 may be mounted within the vehicle cabin such that they have an occupant of the cabin in their field of view. An ultrasonic sensor 106 or other type of sensor may also be mounted in the vehicle cabin having an occupant of the cabin in its field of view. In the illustrated example, the sensors 104, 106 have driver's seating position in their field of view. In some embodiments, both the driver and front passenger seating position are in the field of view of the sensors 104, 106. In some embodiments, separate sensors 104, 106 are used for each of the driver's seating position and the front passenger seating position. In some embodiments, rear seating positions are also in the field of view of the same sensors 104, 106 or a separate set of sensors 104, 106.

Figure 4:
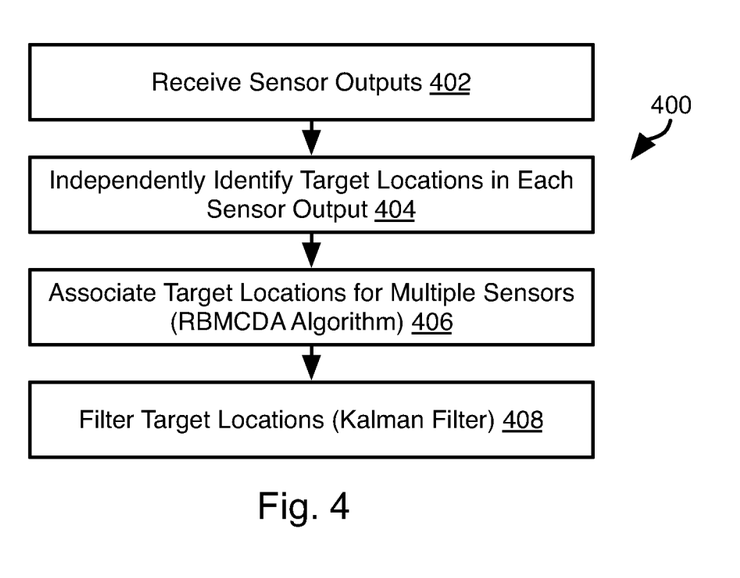
FIG. 4 is a process flow diagram of a method for decoding visual symbols from multiple sensors in accordance with an embodiment of the present invention.

Referring to FIG. 4, the illustrated method 400 may be executed by the controller 102, such as within the vehicle system interface 114, in order to identify ASL symbols executed in the fields of view of the sensors 104, 106. The method 400 may include receiving 402 outputs of the sensors 104, 106.

The outputs are then processed 404 independently in order to identify target locations in each sensor output. In particular, any image analysis technique known in the art may be used to identify targets in each sensor output individually. Targets identified may include parts of the hand, arm, and face of the user as described above. As also noted above, identifying target locations may include identifying a three-dimensional location of the target, i.e. a location that includes depth as well as vertical and lateral locations within an image.

The method 400 may then include associating 406 the target locations with one another. Specifically, the locations determine from the sensor outputs that correspond to the same target may be identified and grouped together or otherwise combined. The manner in which target locations determined from the outputs of multiple sensors are determined to correspond to the same target may include executing the Rao-Blackwellized Monte Carlo Data Association (RBMCDA) algorithm, where the target locations determine from each sensor output are the inputs and the outputs are groupings of locations, each grouping including target locations from multiple sensor outputs that are determined according to the RBMCDA algorithm to correspond to the same target.

The output of the association step 406 may be a list of target locations for a plurality of targets. The step of receiving 402 sensor outputs and the subsequent processing steps 404-406 may be repeated periodically, such that lists of target locations are periodically output as a result of step 406. The method 400 may further include filtering these lists of locations 408 to remove noise and clearly erroneous outliers. Accordingly, each target location may be added to a series of preceding target locations for the same target, and this series of values may be filtered 408, such as using a Kalman filter. The filtering step may take into account contextual information.

Figure 5:
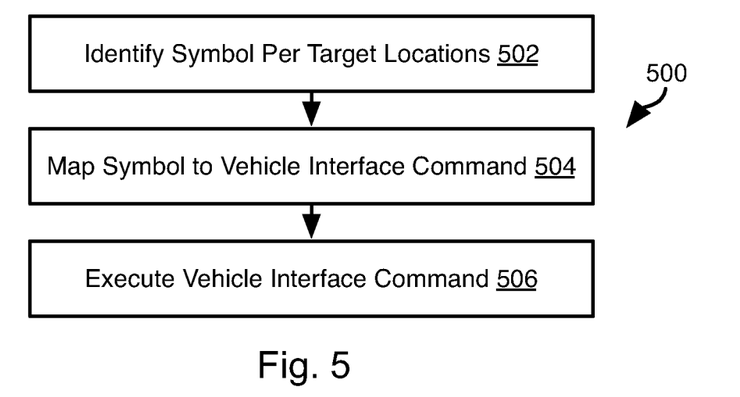
FIG. 5 is a process flow diagram of a method for controlling a vehicle system using a visual symbol in accordance with an embodiment of the present invention.

Referring to FIG. 5, the output of the filtering step 408 is also a list of target locations, which may be modified from the list output at step 406, may be processed according to the method 500. Some ASL symbols involve movement as well as particular configurations of the hand, fingers, and arms. Accordingly, the method 500 may be executed with respect to a set of lists of target locations over a time period in order to determine movements as well as position.

The method 500 may include identifying 502 a symbol according to a list of target locations or a set of lists of target locations. For example, the system may be calibrated by having the user execute a plurality of ASL symbols. As the user executes the symbols, a calibration list target locations, or a calibration set of lists of target locations, may be determined in the same manner as for the method 400 of FIG. 4. A library of calibration lists of target locations or calibration sets of lists of target locations may be obtained in this manner, where each calibration list or calibration set of lists is mapped to a symbol that was executed when the sensor outputs used to obtain them were received.

In some embodiments, calibration is performed in combination with an application executing on a mobile phone or other device of the user. Through the application, the user may be instructed to execute a symbol for a particular interface instruction, word, character, or other data, and the execution of the symbol may then be recorded and associated with that particular interface instruction, word, character, or other data in the manner described above.

In some embodiments, as noted above, a list of target locations may be embodied as, or be transformed to, skeletal mapping vectors that represents the position and orientations of the bones of the user based on the target locations. The skeletal mapping vectors may then be compared to calibration skeletal mapping vectors that were obtained from observation of the user executing symbols during the calibration phase as described above.

Identifying 502 a symbol may include comparing a current list of target locations or a set of lists of target locations based on sensor outputs during user execution of a symbol to the library. The calibration list or calibration set of lists that matches the current list of target locations or set of lists of target locations may be identified.

Once a match is identified, the symbol mapped to the identified calibration list or calibration set of lists is mapped 504 to a vehicle interface command. That command is then executed 506, such as by the vehicle system interface 114.

Figure 6:
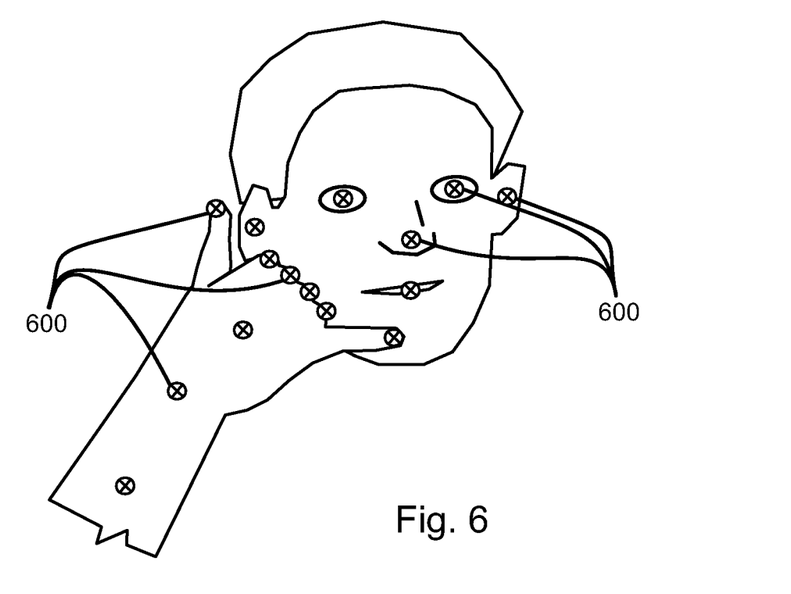
FIG. 6 is a diagram illustrating targets detected in an image in accordance with an embodiment of the present invention.

Referring to FIG. 6, in one example, sensors 104, 106 may capture a three-dimensional image of a user's face, hand, and forearm. For each sensor output, locations 600 of targets may be identified, associated to one another, filtered, and output as a list of target locations as described above with respect to FIG. 4. In the illustrated example, the configuration of the hand with respect to the user's face is the ASL symbol for phone. Accordingly, upon detecting this symbol, the vehicle system interface may invoke placement of a phone call or some other action with respect to a user's mobile phone. Multiple symbols may be captured in order to invoke more complex tasks or to provide parameters defining execution of a task.

In some embodiments, a translation function may be implemented such that a textual or voice reproduction of one or more decoded symbols is output. For example, a driver may input ASL symbols that are then translated to text or speech for a passenger who does not speak ASL.

Figure 7A:
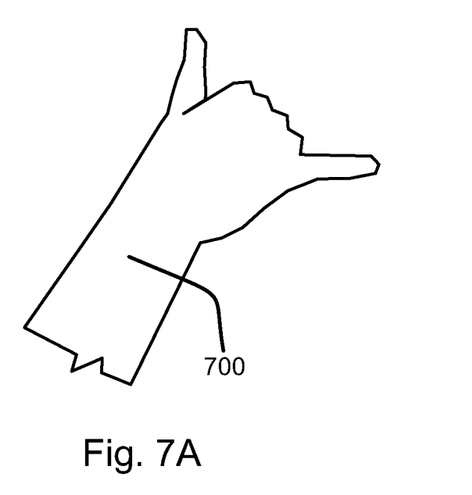
FIGS. 7A and 7B illustrate a method for providing visual confirmation of input of a visual symbol in accordance with an embodiment of the present invention.
Figure 7B:
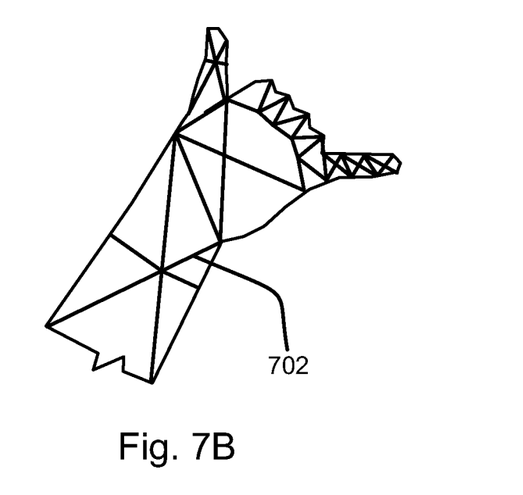

Referring to FIGS. 7A and 7B, in some embodiments, feedback may be provided to the user. For example, as shown in FIG. 7A, a user's hand 700 (or other portions of the user that may be required to execute an ASL symbol) may be displayed on a display device 118. When the executed symbol is successfully decoded, the display of the user's hand may be altered to confirm that the symbol was decoded. In the illustrated example, a mesh representation 702 of the user's hand is shown, such as based on the target locations identified according to the methods disclosed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
capturing, by a vehicle controller of a vehicle, three-dimensional (3D) data of a user inside the vehicle using a plurality of sensors;
determining, based on the 3D data, that the user executed a sign language symbol;
receiving a plurality of outputs from the plurality of sensors;
identifying, based on the plurality of outputs, a plurality of target locations corresponding to a portion of a hand of the user;
for each portion of a plurality of portions of the hand of the user:
associating a target location to a group of target f the hand of the user for each sensor of the plurality of sensors; and
filtering the group of target locations for the each portion to obtain a filtered target location; and
identifying the sign language symbol according to the filtered target locations for the plurality of portions of the hand of the user; and
invoking a vehicle interface function corresponding to the sign language symbol, wherein the vehicle interface function is output of a textual or audible translation of the sign language symbol.

2. The method of claim 1, wherein the vehicle interface function is a navigation function.

3. The method of claim 1, wherein the vehicle interface function is a sound system control function.

4. The method of claim 1, wherein the sensor is a three-dimensional optical sensor.

5. The method of claim 1, wherein the sensor is one of a plurality of sensors, the plurality of sensors including a plurality of three-dimensional optical sensors.

6. The method of claim 1, wherein the sensor is one of a plurality of sensors, the plurality of sensors including at least one of a three-dimensional optical sensor and an ultrasonic sensor.

7. The method of claim 1, wherein associating a target location to the group of target locations for the each portion of the hand of the user for each sensor of the plurality of sensors comprises performing a Rao-Blackwellized Monte Carlo Data Association (RBMCDA) algorithm.

8. The method of claim 7, wherein temporally filtering the group of target locations for the each portion to obtain the filtered target location comprises performing Kalman filtering.

9. A vehicle comprising:
a plurality of vehicle systems housed in the vehicle;
a sensor; and
a controller housed in the vehicle and operably coupled to the plurality of vehicle systems and the sensor, the controller programmed to:
  capture three-dimensional (3D) data of a user inside the vehicle using the sensor;
  determine, based on the 3D data, that the user executed a sign language symbol;
  identify, based on an output of the sensor, a plurality of target locations corresponding to a portion of a hand of the user;
  associate a target location to a group of target locations for a plurality of portions of the hand of the user;
  filter the group of target locations for the plurality of portions to obtain a filtered target location;
  identify the sign language symbol according to the filtered target locations for the plurality of portions of the hand of the user; and
  invoke a vehicle interface function of one of the plurality of vehicle systems corresponding to the sign language symbol, wherein the vehicle interface function is output of a textual or audible translation of the sign language symbol.

10. The vehicle of claim 9, wherein the vehicle interface function is a navigation function.

11. The vehicle of claim 9, wherein the vehicle interface function is a sound system control function.

12. The vehicle of claim 9, wherein the sensor is a three-dimensional optical sensor.

13. The vehicle of claim 9, wherein the sensor is one of a plurality of sensors, the plurality of sensors including a plurality of three-dimensional optical sensors.

14. The vehicle of claim 9, wherein the sensor is one of a plurality of sensors, the plurality of sensors including at least one of a three-dimensional optical sensor and an ultrasonic sensor.

15. The vehicle of claim 1, wherein the controller is further programmed to associate a target location to the group of target locations for the each portion of the hand of the user for each sensor of the plurality of sensors by performing a Rao-Blackwellized Monte Carlo Data Association (RBMCDA) algorithm.

16. The vehicle of claim 15, wherein the controller is further programmed to temporally filter the group of target locations for the each portion to obtain the filtered target location by performing Kalman filtering.

* * * * *